United States Patent
Meng

(10) Patent No.: US 9,052,213 B2
(45) Date of Patent: Jun. 9, 2015

(54) NAVIGATION APPARATUS FOR DYNAMICALLY DISPLAYING MULTIPLE FRAMES OF HOUSE NUMBER AND METHOD THEREOF

(75) Inventor: Jing-Shi Meng, Shanghai (CN)

(73) Assignees: MiTAC International Corp., Kuei San Township (TW); MiTAC Research (Shanghai) Ltd., Shanghai (CN)

( * ) Notice: Subject to any disclaimer, the term of this patent is extended or adjusted under 35 U.S.C. 154(b) by 929 days.

(21) Appl. No.: 13/243,028

(22) Filed: Sep. 23, 2011

(65) Prior Publication Data
US 2013/0054140 A1 Feb. 28, 2013

(30) Foreign Application Priority Data
Aug. 29, 2011 (CN) .......................... 2011 1 0251257

(51) Int. Cl.
G08G 1/123 (2006.01)
G01C 21/12 (2006.01)
G01C 21/36 (2006.01)
G01C 21/32 (2006.01)
G09B 29/10 (2006.01)
G01C 21/26 (2006.01)

(52) U.S. Cl.
CPC ............ *G01C 21/3673* (2013.01); *G01C 21/32* (2013.01); *G09B 29/106* (2013.01); *G01C 21/26* (2013.01)

(58) Field of Classification Search
USPC .......... 701/468, 426, 438, E17.018, 532–533; 715/771, 837, 864, 834, 810; 707/919
See application file for complete search history.

(56) References Cited

U.S. PATENT DOCUMENTS

| | | | | |
|---|---|---|---|---|
| 7,240,008 B2* | 7/2007 | Hitotsumatsu | ................ | 704/275 |
| 7,970,807 B2* | 6/2011 | Boudreau et al. | ............. | 707/920 |
| 8,166,083 B2* | 4/2012 | Boudreau et al. | ............. | 707/920 |
| 8,185,839 B2* | 5/2012 | Jalon et al. | .................... | 715/769 |
| 8,201,096 B2* | 6/2012 | Robert et al. | ................. | 715/767 |

(Continued)

OTHER PUBLICATIONS

Remote vehicle tracking system using GSM Modem and Google map ;Ahmad Fuad, M.R. ; Drieberg, M.;Sustainable Utilization and Development in Engineering and Technology (CSUDET), 2013 IEEE Conference on; DOI: 10.1109/CSUDET.2013.6670977; Publication Year: 2013 , pp. 15-19.*

(Continued)

*Primary Examiner* — Cuong H Nguyen
(74) *Attorney, Agent, or Firm* — Wang Law Firm, Inc.; Li K. Wang; Stephen Hsu

(57) ABSTRACT

A navigation apparatus for dynamically displaying multiple frames of house number and its method. The navigation apparatus comprises a road information temporary storage module, a frame information temporary storage module, a processing module and a display unit. The real-time road information is temporarily stored at the road information temporary storage module; a house number information, a point of interesting or user customized information is temporarily stored at the frame information temporary storage module. Furthermore, the processing module updates the real-time road information and the house number information, the point of interesting or the user customized information corresponding to real-time road information according to a global positioning system signal. The display unit displays real-time road information and plays house number information, the point of interesting or user customized information by turns.

9 Claims, 9 Drawing Sheets

(56) References Cited

U.S. PATENT DOCUMENTS

| | | | |
|---|---|---|---|
| 8,639,214 B1* | 1/2014 | Fujisaki | 455/406 |
| 8,676,273 B1* | 3/2014 | Fujisaki | 455/567 |
| 8,707,192 B2* | 4/2014 | Robert et al. | 715/767 |
| 8,713,462 B2* | 4/2014 | Robert et al. | 715/767 |
| 8,732,600 B2* | 5/2014 | Robert et al. | 715/767 |
| 8,788,604 B2* | 7/2014 | Boudreau et al. | 709/206 |
| 2003/0065516 A1* | 4/2003 | Hitotsumatsu | 704/275 |
| 2004/0155907 A1* | 8/2004 | Yamaguchi et al. | 345/810 |
| 2007/0087756 A1* | 4/2007 | Hoffberg | 455/450 |
| 2009/0055774 A1* | 2/2009 | Joachim | 715/810 |
| 2011/0161076 A1* | 6/2011 | Davis et al. | 704/231 |

OTHER PUBLICATIONS mTracker: A Mobile Tracking Application for Pervasive Environment;Varandas, L.C.M. ; Vaidya, B. ; Rodrigues, J.J.P.C. Advanced Information Networking and Applications Workshops (WAINA), 2010 IEEE 24th International Conference on DOI: 10.1109/WAINA.2010.164;Publication Year: 2010 , pp. 962-967.*

The design and implementation of a surveillance and self-driven cleanup system for blue-green algae blooms on Lake Tai;Dong Li ; Ze Zhao ; Li Cui ; He Zhu ; Le Zhang ; Zhaoliang Zhang ; Yi Wang ; HaiMing Chen; Mobile Adhoc and Sensor Systems (MASS), 2010 IEEE 7th International Conference on; DOI: 10.1109/MASS.2010. 5663830; Publication Year: 2010.*

MBARI mapping AUV operations: in the Gulf of California; Thompson, D. ; Caress, D. ; Paull, C. ; Clague, D. ; Thomas, H. ; Conlin, D; Oceans, 2012; DOI: 10.1109/OCEANS.2012.6404882; Publication Year: 2012 , pp. 1-5.*

An abstract of "Selective Eigenbackground for Background Modeling and Subtraction in Crowded Scenes"; Yonghong Tian ; Yaowei Wang ; Zhipeng Hu ; Tiejun Huang; Circuits and Systems for Video Technology, IEEE Transactions on; vol. 23 , Issue: 11; DOI: 10.1109/ TCSVT.2013.2248239; Publication Year: 2013 , pp. 1849-1864.*

The smartphone as enabler for road traffic information based on cellular network signalling; Gundlegard, D. ; Karlsson, J.M. Intelligent Transportation Systems—(ITSC), 2013 16th International IEEE Conference on; DOI: 10.1109/ITSC.2013.6728540 Publication Year: 2013 , pp. 2106-2112.*

New methodology for the identification of road surface anomalies; Astarita, V. ; Festa, D.C. ; Mongelli, D.W.E. ; Tassitani, A. Service Operations and Logistics, and Informatics (SOLI), 2014 IEEE International Conference on; DOI: 10.1109/SOLI.2014.6960710; Publication Year: 2014 , pp. 149-154.*

\* cited by examiner

NAVIGATION APPARATUS FOR DYNAMICALLY DISPLAYING MULTIPLE FRAMES OF HOUSE NUMBER AND METHOD THEREOF

CROSS-REFERENCE TO RELATED APPLICATION

This application claims the benefit of China Patent Application No. 201110251257.0, filed on Aug. 29, 2011, in the State Intellectual Property Office of the People's Republic of China, the disclosure of which is incorporated herein in its entirety by reference.

BACKGROUND OF THE INVENTION

1. Field of the Invention

The present invention relates to a navigation apparatus for dynamically displaying multiple frames of house number and the method thereof, and more particularly to a navigation apparatus for dynamically displaying multiple frames of house number and the method thereof having functions of dividing house numbers into a plurality of frames and dynamically displaying these frames without overlapping.

2. Description of the Related Art

A conventional navigation apparatuses usually have functions of key word search, map search or setting point of interesting. A user then sets content to be displayed, such as road name, house numbers, points of interesting or user customized information while using the navigation apparatus.

The maps and house numbers displayed by the conventional navigation apparatus are a set of points corresponding to each road in a space, which contain text description about the house number.

Generally speaking, a road only corresponds to one street name, and the street name is drawn on the road while in display. It seldom happens that one street name overlaps another street name. However, the quantity of house numbers is different from the street name. The quantity of house numbers is quite huge. It will be a mess that displaying all house numbers in the screen of the navigation apparatus.

With reference to FIG. 1 for a schematic diagram of displaying overlapped house numbers according to prior art is depicted. As shown in FIG. 1, the navigation apparatus capable of displaying house numbers overlaps and displays multiple house numbers on the same map screen based upon the street name. However, the manner of displaying all house numbers on the screen may not allow the user to easily recognize house numbers and may easily get lost.

Another technique way is that icons are displayed in connection with the point of interesting based upon personal request of a user. However, house numbers and street names must be clearly displayed to avoid unclear marking, such that the user will not have difficulties with reading the navigation information. Therefore, area occupied by house numbers and street names that are shown on the screen is absolutely larger than the icons of points of interesting.

FIG. 2 is a schematic diagram of relocating icons of points of interesting in prior art. Presently, the manner of displaying the points of interesting on the navigation apparatus is that the icons are relocated while the icons of the points of interesting and the house number overlap each other. The positions of many house numbers are shifted from originally accurate location points after relocating the icons. Consequently, the user is unable to recognize the directions as shown in FIG. 2. Moreover, although marking a line between the shifted location point and the originally accurate location point represents orientation, the line is usually drawn on other house numbers. Therefore, the foregoing situation is the same as FIG. 1, and the marked line would overlap house numbers such that the user is difficult to recognize the position and direction.

To overcome the foregoing defects, the invention is related to a navigation apparatus for dynamically displaying multiple frames of house number.

SUMMARY OF THE INVENTION

In view of the shortcomings of the prior art, the inventor(s) of the present invention based on years of experience in the related industry to conduct extensive researches and experiments, and finally developed a navigation apparatus for dynamically displaying multiple frames of house number and its method as a principle objective to overcome the problem that is difficult to recognize position and direction of house number in prior arts.

To achieve the foregoing objective, a navigation apparatus is provided and comprises a road information temporary storage module, a frame information temporary storage module, a processing module and a display unit. The road information temporary storage module temporarily stores real-time road information. The frame information temporary storage module temporarily stores house number information or a point of interesting or user customized information. Moreover, the processing module updates real-time road information and house number information or the point of interesting or user customized information corresponding to real-time road information based upon a GPS signal. The display unit displays real-time road information and alternately displays house number information or the point of interesting or user customized information.

In the navigation apparatus for dynamically displaying multiple frames of house number of the invention, the road information temporary storage module temporarily stores real-time road information of an area around a user's current location and temporarily stores house number information of real-time road information of the area around the user's current location and house number information of real-time road information about the house numbers which have been passed by the user.

The processing module comprises a fluctuation unit and a frame calculation unit. The fluctuation unit performs fluctuation calculation based upon real-time road information and house number information or the point of interesting or user customized information corresponding to real-time road information. The frame calculation unit calculates a plurality of frames based upon house number information or the point of interesting or user customized information.

To achieve the foregoing objective, a method for dynamically displaying multiple frames of house number is further provided and applied to a navigation apparatus. Firstly, real-time road information is temporarily stored by a road information temporary storage module, and house number information or a point of interesting or user customized information is temporarily stored by a frame information temporary storage module. A processing module then is utilized to update real-time road information and house number information or a point of interesting or user customized information corresponding to real-time road information based upon a GPS signal. Finally, the display unit displays real-time road information and alternately displaying door house information or the point of interesting or user customized information.

The road information temporary storage module is utilized to temporarily store real-time road information of the area around the user's current location and to temporarily store house number information of the area around the user's current location and house number information about the house numbers which have been passed by the user.

In addition, the processing module has a fluctuation unit and a frame calculation unit The method further comprises the following steps: performing the fluctuation calculation through the fluctuation unit based upon real-time road information and house number information or a point of interesting or user customized information corresponding to real-time road information; and calculating a plurality of frames through the frame calculation unit based upon real-time road information and house number information or a point of interesting or user customized information.

The user can divide house number into a plurality of frames, and its navigation information is dynamically displayed so as to differ from the previous broadcast and display manner of searching house numbers during the navigation. The invention uses the method of dynamically displaying multiple frames of house number to overcome the problem that is difficult to recognize the location and direction of house numbers in prior art.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The foregoing and other technical characteristics of the present invention will become apparent with the detailed description of the preferred embodiments and the illustration of the related drawings.

Figure 1:
FIG. 1 is a schematic diagram of overlapping and displaying multiple house numbers according to road names in prior art.
Figure 2:
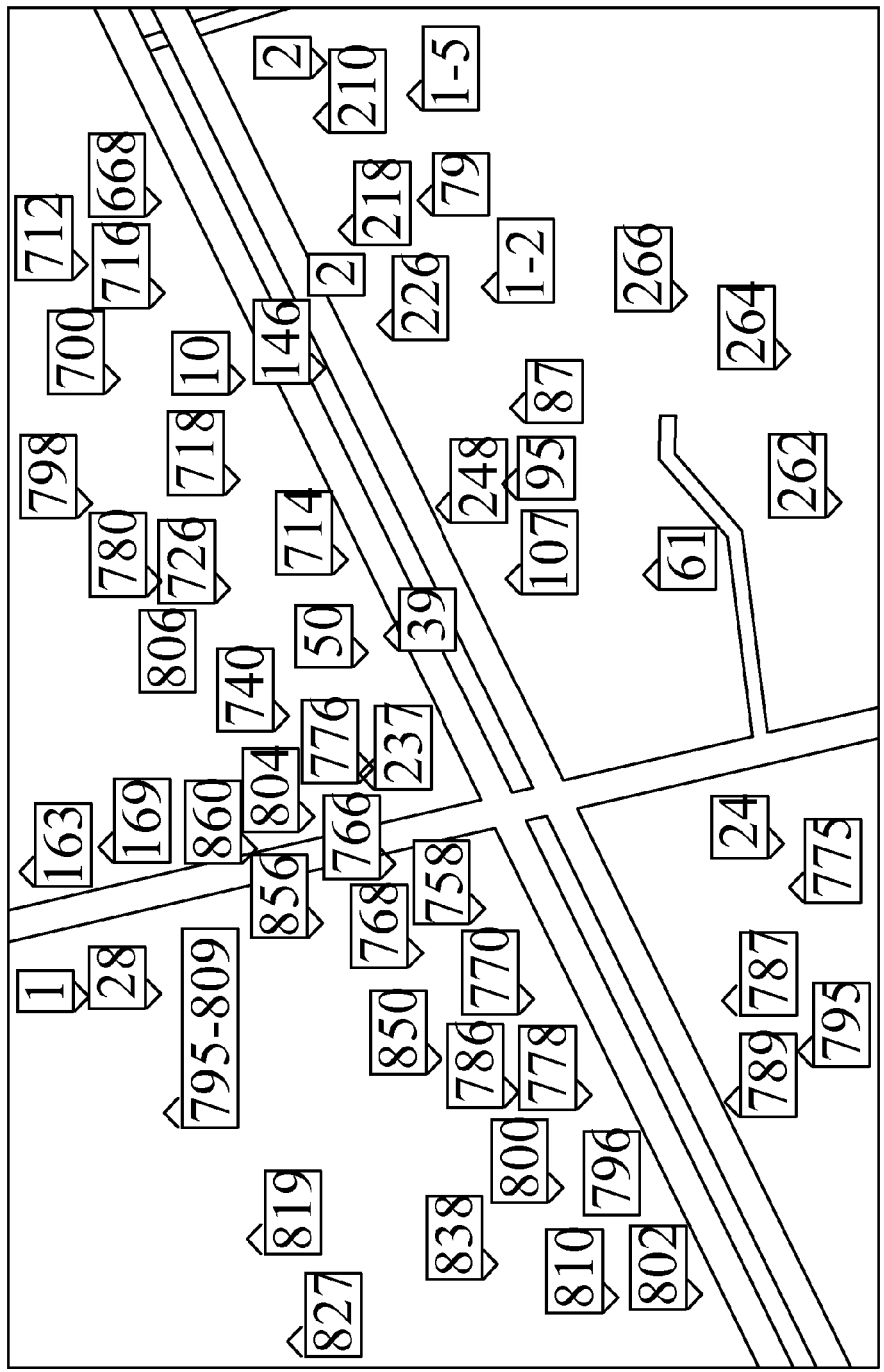
FIG. 2 is a schematic diagram of relocating icons of points of interesting in prior art.
Figure 3:
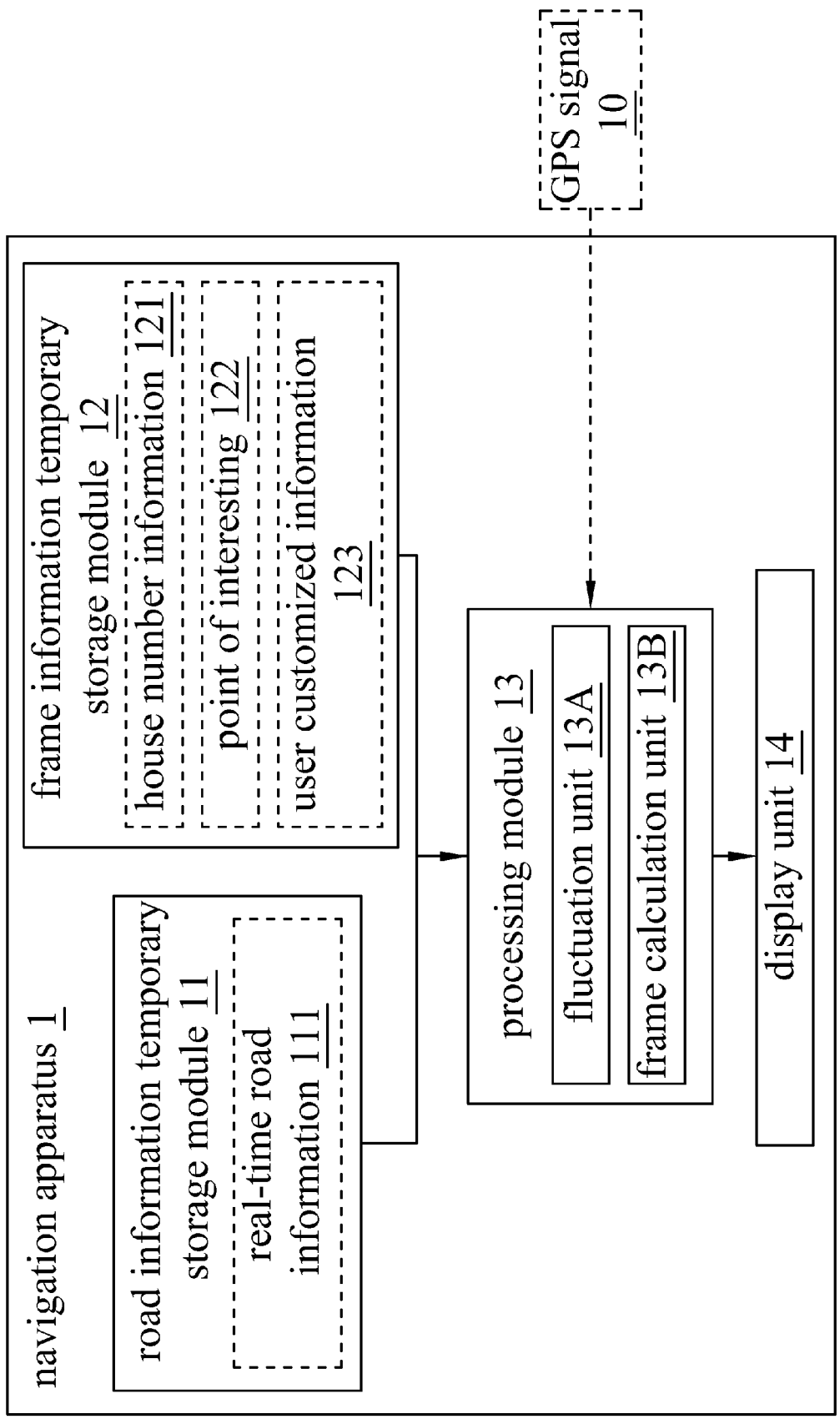
FIG. 3 is a block diagram of a navigation apparatus according to a first embodiment of the invention.

With reference to FIG. 3 for a block diagram of a navigation apparatus in accordance with a first embodiment of the invention is depicted. The navigator apparatus 1 comprises a road information temporary storage module 11, a frame information temporary storage module 12, a processing module 13 and a display unit 14. The road information temporary storage module 11 can temporarily store real-time road information 111. The frame information temporary storage module 12 can temporarily store house number information 121 or a point of interesting 122 or user customized information 123. The processing module 13 updates real-time road information 111 based upon a GPS signal 10 and corresponds to house number information 121, the point of interesting 122 or user customized information 123 of real-time road information 111. Moreover, the display unit 14 displays real-time road information 111 and alternately displays house number information 121, the point of interesting 122 or user customized information 123.

In the embodiment, the processing module 13 further comprises a fluctuation unit 13A and a frame calculation unit 13B. The fluctuation unit 13A performs fluctuation calculation based upon real-time road information 111 and house number information 121, the point of interesting 122 or user customized information 123 corresponding to real-time road information 111. The frame calculation unit 13B performs the calculation based upon house number information 121, the point of interesting 122 or user customized information 123 to compute a plurality of frames.

Figure 4:
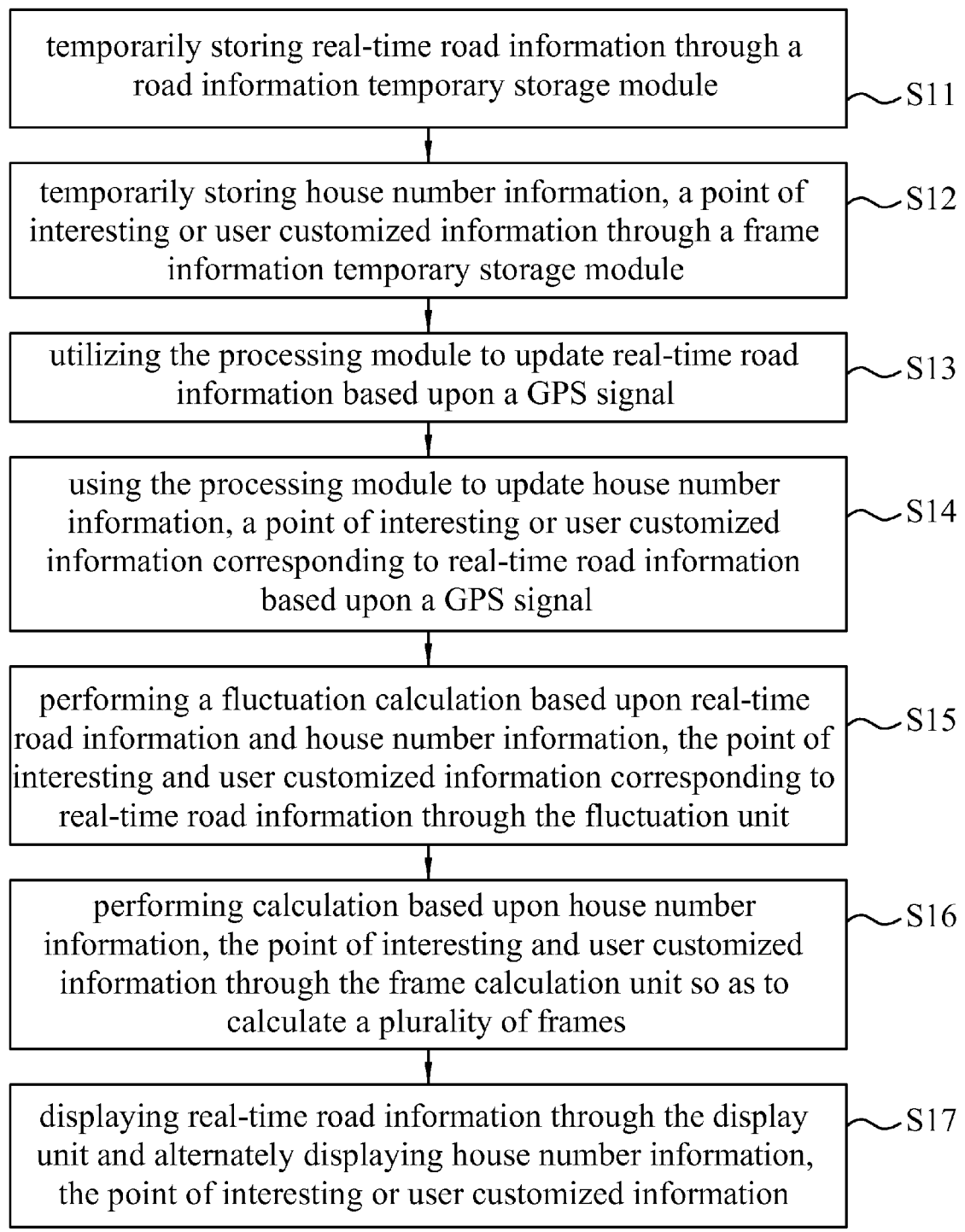
FIG. 4 is a flowchart of the method for dynamically displaying multiple frames of house number according to a first embodiment of the invention.

With reference to FIG. 4 for a flowchart of a method for dynamically displaying multiple frames of house number in accordance with a first embodiment of the invention is depicted. The method comprises the following steps: step S11: temporarily storing real-time road information through a road information temporary storage module; and step S12: temporarily storing house number information, a point of interesting or user customized information through a frame information temporary storage module.

The road information temporary storage module further stores real-time road messages of an area or a user's location in the navigation apparatus. It should be noted that the road information temporary storage module can store house number information of real-time road information associated with the user's location and house number information that has been passed by the user.

In step S13, the processing module is utilized to update real-time road information based upon a GPS signal; in step S14, the processing module is used to update house number information, a point of interesting or user customized information corresponding to real-time road information.

Accordingly, when the navigation apparatus or the user is moving, road information can be updated by real-time road information through the foregoing steps S13 and S14. Moreover, house number information, the point of interesting or use customized information can be further updated.

Afterward, step S15 and step S16 are performed, when in step S15, a fluctuation calculation is performed based upon real-time road information and house number information, the point of interesting and user customized information corresponding to real-time road information through the fluctuation unit; in step S16, calculation is performed based upon house number information, the point of interesting and user customized information through the frame calculation unit so as to calculate a plurality of frames.

It should be noted that the fluctuation unit in the processing module can remove road information, which is not updated yet, in real-time road information in the light of house number information corresponding to updated road information. In addition, a frame calculation unit in the processing module can calculate corresponding frames in the light of updated road information and corresponding house number information. Therefore, real-time road information capable of corresponding to information that is the same as the foregoing information including house number information, the point of interesting or user customized information.

Finally, as shown in step S17, real-time road information is displayed through the display unit and house number information, the point of interesting or user customized information is alternately displayed.

It should be noted that time interval and manner of information displaying or alternatively displaying are different based upon user setting. For example, the display module is updated at one-second interval based upon the GPS signal. Alternatively, a plurality of frames is dynamically displayed at regular intervals.

According to the first embodiment, the invention further provides a second embodiment for detail depiction.

Figure 5A:
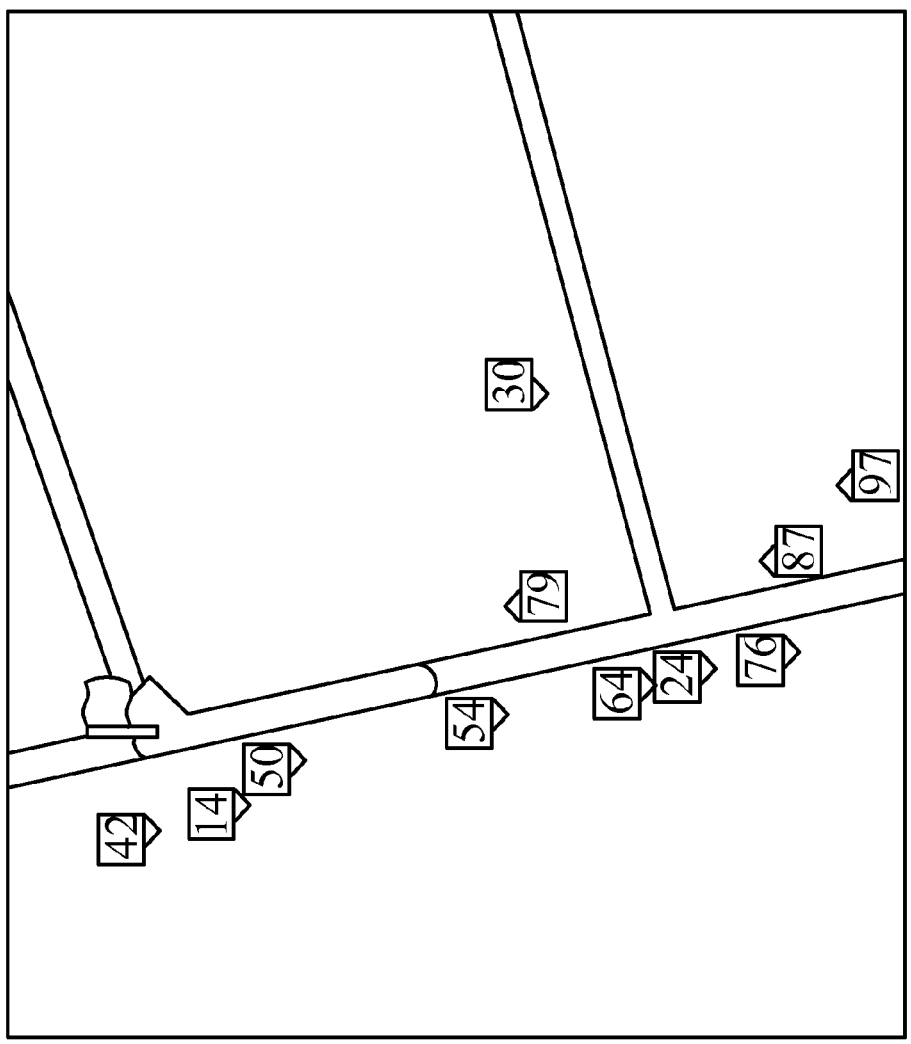
FIG. 5A to FIG. 5C are schematic diagrams of a navigation apparatus and its method according to the invention.
Figure 5B:
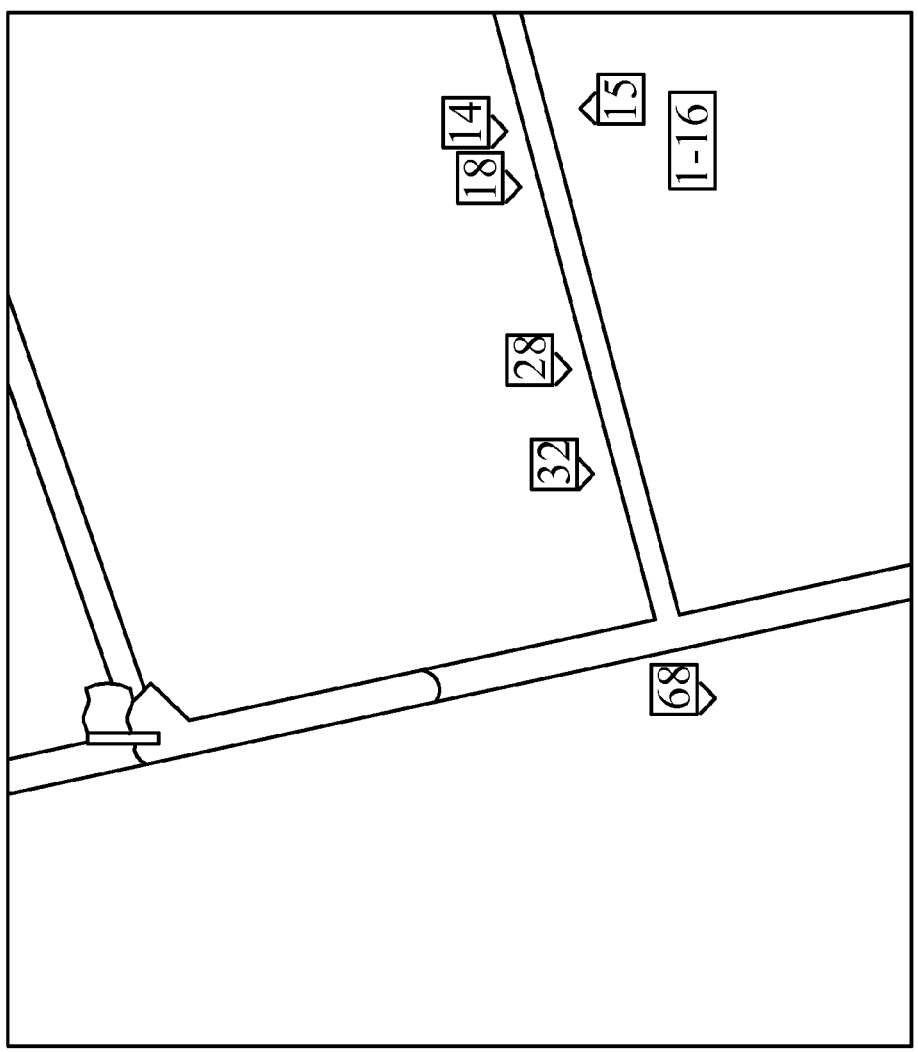
Figure 5C:
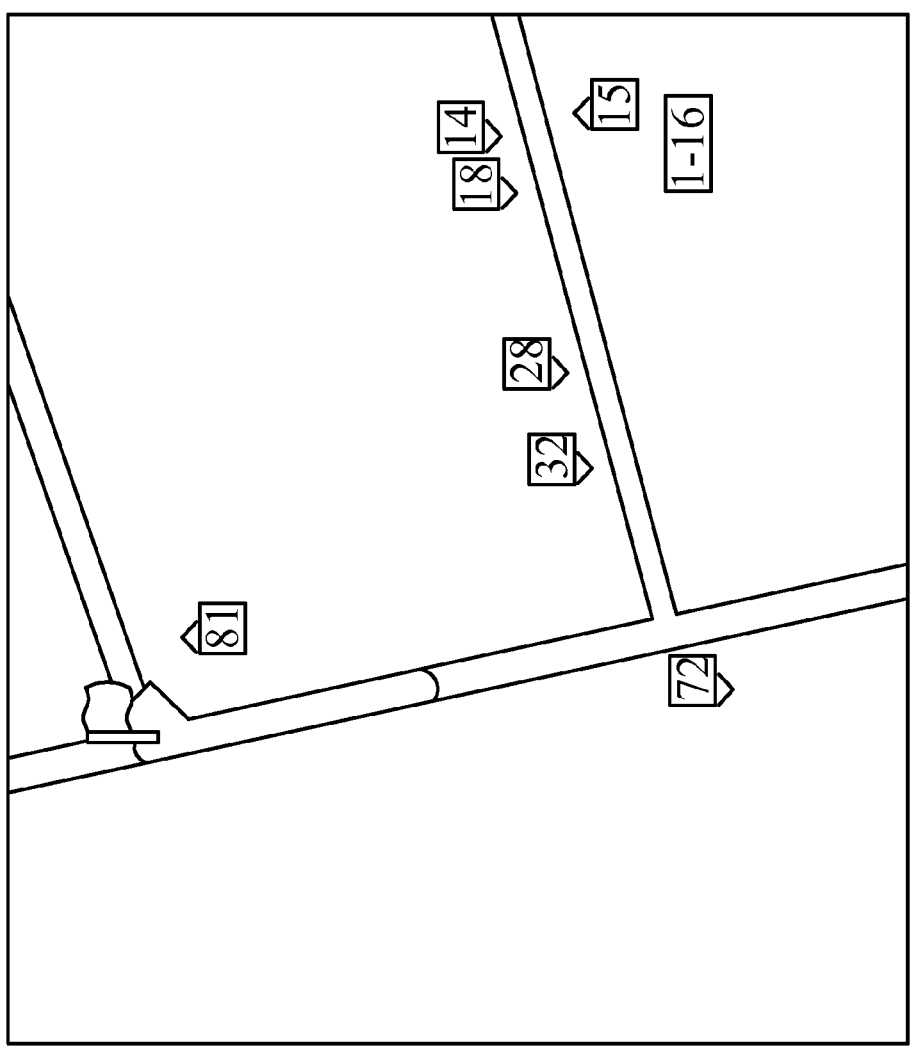

With reference to FIG. 5A to FIG. 5C for schematic diagrams of a navigation apparatus and the method thereof in accordance with the second embodiment of the invention are depicted. FIG. 5A is a schematic diagram of a first frame, FIG. 5B is a schematic diagram of a second frame, and FIG. 5C is a schematic diagram of a third frame.

In the embodiment, the navigation apparatus is at the same position or the area. The display module displays house numbers of the same area and displays the first frame to third frame in a dynamic way. After the third frame is displayed, the first frame is circularly displayed or the map frames are replaced based upon time intervals set by the user. One frame is not continued with one frame. To prevent visual flicker, the effect of switching slides can be added while switching each frame, for example the function of fading-in and fading-out in Power point. The user can set the time interval of each frame.

Figure 6:
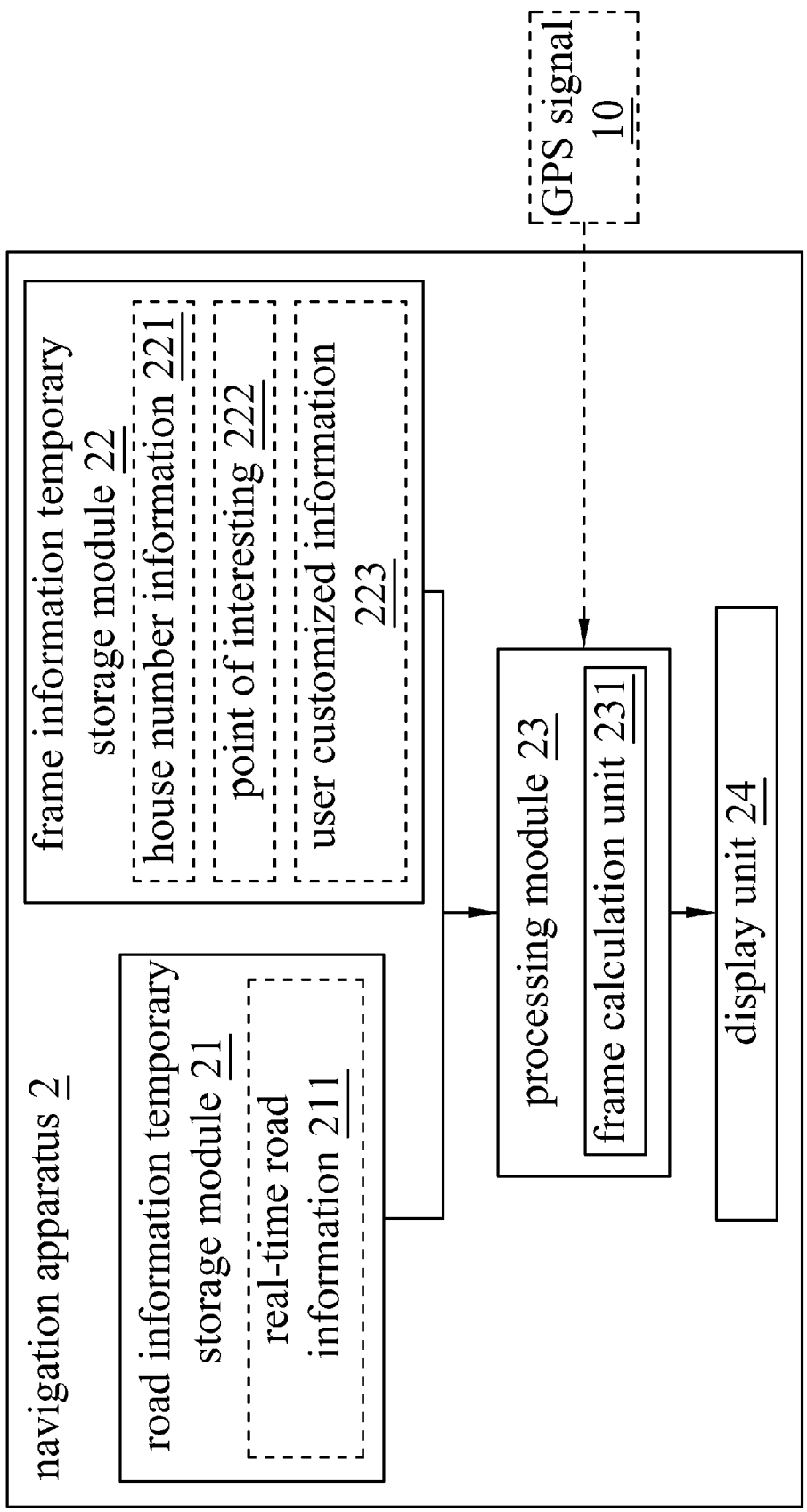
FIG. 6 is a block diagram of a navigation apparatus according to a second embodiment of the invention.

With reference to FIG. 6 for a block diagram of a navigation apparatus in accordance with a second embodiment of the invention is depicted. The navigation apparatus 2 comprises a road information temporary storage module 21, a frame information temporary storage module 22, a processing module 23 and a display unit 24.

The road information temporary storage module 21 can temporarily store real-time road information 211. The frame information temporary storage module 22 can temporarily store house number information 221 or a point of interesting 222 or user customized information 223. The processing module 23 updates real-time road information 211 based upon a GPS signal 10 and corresponds to house number information 221, the point of interesting 222 or user customized information 223 of real-time road information 211. Moreover, the display unit 23 displays real-time road information 211 and alternately displays house number information 221, the point of interesting 222 or user customized information 223.

In the embodiment, the processing module 23 further comprises a frame calculation unit 231. The frame calculation unit 231 performs calculation based upon house number information 221, the point of interesting 222 or user customized information 223 so as to calculate a plurality of frames.

Figure 7:
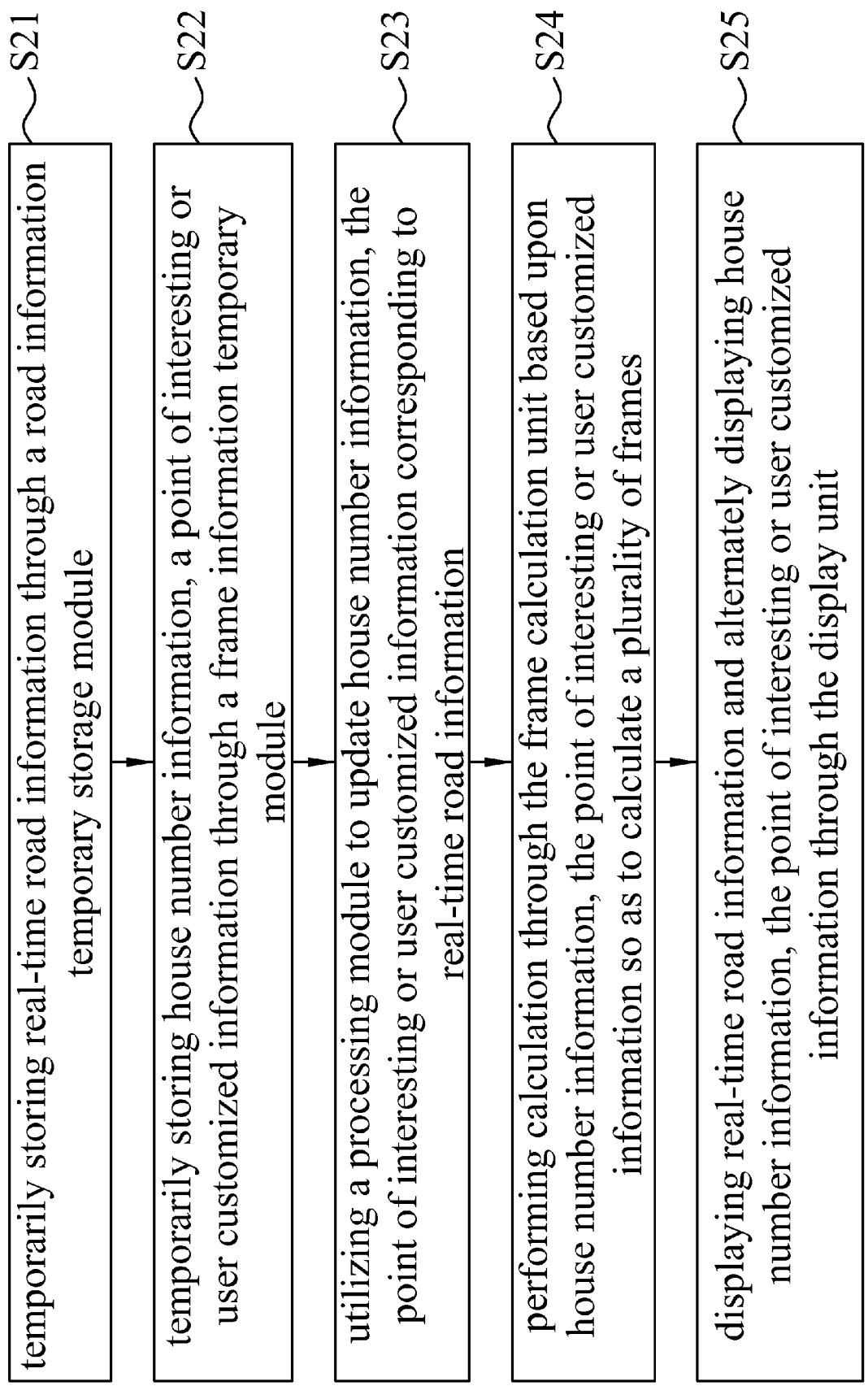
FIG. 7 is a flowchart of the method for dynamically displaying multiple frames of house number according to a second embodiment of the invention.

FIG. 7 is a flowchart of a method for dynamically displaying multiple frames of house number in accordance with a second embodiment of the invention. In the embodiment, a navigation apparatus is at the same location or area. Please refer to FIG. 7. As shown in step S21 and step S22. In step S21, real-time road information is temporarily stored through a road information temporary storage module; in step S22, house number information, a point of interesting or user customized information is temporarily stored through a frame information temporary module.

The road information temporary storage module further stores a navigation apparatus or real-time road information about a location or an area where a user or a navigation apparatus is located and stores house number information of real-time road information of the user's location.

Next, as shown in step S23 and step S24, when in step S23, a processing module is utilized to update house number information, the point of interesting or user customized information corresponding to real-time road information based upon a GPS signal; in step S24, calculation is performed through the frame calculation unit based upon house number information, the point of interesting or user customized information so as to calculate a plurality of frames.

It should be noted that the frame calculation unit can calculate corresponding frames according to road information and corresponding house number information. Therefore, real-time road information capable of corresponding to information that is the same as the foregoing information includes house number information, the point of interesting or user customized information.

Finally, as shown in step S25, real-time road information is displayed and house number information, the point of interesting or user customized information is alternately displayed through the display unit.

The apparatus for dynamically displaying multiple frames of house number and the method thereof have one or multiple following advantages.

(1) The navigation apparatus for dynamically displaying multiple frames of house number and the method thereof are to dynamically display house numbers in multiple frames of icons which don't overlap each other, and are every clear and convenient while in use.

(2) The navigation apparatus for dynamically displaying multiple frames of road house number and the method thereof further comprise a processing module used to update real-time road information and house number information, the point of interesting or user customized information corresponding to real-time road information based upon the GPS signal.

(3) The navigation apparatus for dynamically displaying multiple frames of road house number and the method further comprises a display unit for displaying real-time road information and alternately displaying house number information, the point of interesting or user customized information.

The invention improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. A navigation apparatus comprising:
 a road information storage module storing at least a real-time road information;
 a frame information storage module storing at least a house number information or a point of interesting or user customized information;
 a processing module updating the real-time road information and the house number information or the point of interesting or the user customized information corresponding to the real-time road information based upon a Global Positioning System signal (GPS), wherein the processing module calculates a plurality of frames based upon the house number information, the point of interesting or the user customized information, wherein each of the frames has a set of the house number information; and
 a display unit displaying the real-time road information and alternately displaying the frames.

2. The navigation apparatus as recited in claim 1, wherein the road information storage module stores the real-time road information of an area around a user's current location.

3. The navigator apparatus as recited in claim 2, wherein the road information storage module stores the house number information of the real-time road information of the area around the user's current location and the house number information of the real-time road information about house numbers which have been passed by the user.

4. The navigation apparatus as recited in claim 1, wherein the processing module comprises a fluctuation unit and a frame calculation unit.

5. The navigation apparatus as recited in claim 4, wherein the fluctuation unit performs fluctuation calculation based upon the real-time road information and the house number information or the point of interesting or the user customized information corresponding to the real-time road information.

6. A method for dynamically displaying multiple frames of house number applied to a navigation apparatus, the method comprising the following steps:
- storing at least a real-time road information through a road information storage module;
- storing a house number information or a point of interesting or a user customized information through a frame information storage module;
- using a processing module to update the real-time road information and the house number information or the point of interesting or the user customized information corresponding to the real-time road information based upon a GPS signal;
- calculating a plurality of frames through the processing module based upon the real-time road information and the house number information, the point of interesting or the user customized information, wherein each of the frames has a set of the house number information; and
- displaying the real-time road information and alternately displaying the frames through a display unit.

7. The method for dynamically displaying multiple frames of house number as recited in claim 6, wherein the processing module comprises a fluctuation unit and a frame calculation unit, and the method further comprises the following steps:
- performing fluctuation calculation through the fluctuation unit based upon the real-time road information and the house number information or the point of interesting or the user customized information corresponding to the real-time road information.

8. The method for dynamically displaying multiple frames of house number as recited in claim 6, further comprising the following step: utilizing the road information storage module to store the real-time road information of an area around a user's current location.

9. The method for dynamically displaying multiple frames of house number as recited in claim 8, wherein the road information storage module stores the house number information of the real-time road information of the area around the user's current location and the house number information of the real-time road information about the house numbers which have been passed by the user.

* * * * *